US010254755B2

(12) United States Patent
Chow et al.

(10) Patent No.: US 10,254,755 B2
(45) Date of Patent: Apr. 9, 2019

(54) METHODS AND SYSTEMS FOR DRONE NETWORK DELIVERY SYSTEM

(71) Applicant: INTERNATIONAL BUSINESS MACHINES CORPORATION, Armonk, NY (US)

(72) Inventors: Stephen Chow, Plano, TX (US); Grant D. Miller, Arvada, CO (US); Nader M. Nassar, Yorktown Heights, NY (US); Richard J. Newhook, Egg Harbor City, NJ (US); Erich D. Walls, Valparaiso, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/401,256

(22) Filed: Jan. 9, 2017

(65) Prior Publication Data
US 2018/0196422 A1    Jul. 12, 2018

(51) Int. Cl.
*B64C 39/00* (2006.01)
*G06Q 10/00* (2012.01)
*G05D 1/00* (2006.01)
*B64C 39/02* (2006.01)
*G06Q 10/08* (2012.01)

(52) U.S. Cl.
CPC ......... *G05D 1/0027* (2013.01); *B64C 39/024* (2013.01); *G05D 1/0022* (2013.01); *G06Q 10/0834* (2013.01); *B64C 2201/128* (2013.01); *B64C 2201/146* (2013.01)

(58) Field of Classification Search
CPC ...... G05D 1/00; G05D 1/0027; G05D 1/0022; B64C 39/00; B64C 39/024; G06Q 10/00; G06Q 10/0834
See application file for complete search history.

(56) References Cited

U.S. PATENT DOCUMENTS 7,469,183 B2 *   12/2008   Bodin .................. G05D 1/0027
                                                       701/23
9,307,383 B1     4/2016   Patrick
9,373,149 B2     6/2016   Abhyanker
(Continued)

OTHER PUBLICATIONS

Anonymous, "Method and System for Enabling Drones to Maintain Balance during Multiple Package Delivery," An IP.com Prior Art Database Technical Disclosure, IP.com No. IPCOM000244630D, Dec. 30, 2015 (5 pages).

(Continued)

*Primary Examiner* — Yonel Beaulieu
(74) *Attorney, Agent, or Firm* — Griffiths & Seaton PLLC

(57) ABSTRACT

Embodiments for managing drones by one or more processors are described. Information about each of a plurality of drones is received. Each of the plurality of drones is associated with a respective one of a plurality of users. A request to transport an item from an origination point to a destination is received. Based on the information about the plurality of drones, the origination point, and the destination, a first of the plurality of drones is selected to transport the item from the origination point to an intermediate region. Based on the information about the plurality of drones, the origination point, and the destination, a second of the plurality of drones is selected to transport the item from the intermediate region to the destination.

21 Claims, 11 Drawing Sheets

(56) References Cited

U.S. PATENT DOCUMENTS

| | | | |
|---|---|---|---|
| 9,679,490 | B2 | 6/2017 | Ceribelli et al. |
| 9,692,498 | B2 | 6/2017 | Fan et al. |
| 9,875,454 | B2 * | 1/2018 | Kantor .................. G08G 5/0013 |
| 10,127,822 | B2 * | 11/2018 | Damnjanovic ....... B64C 39/024 |
| 2015/0327136 | A1 | 11/2015 | Kim et al. |
| 2015/0370251 | A1 * | 12/2015 | Siegel .................. G05D 1/0027 |
| | | | 701/2 |
| 2016/0200438 | A1 | 7/2016 | Bokeno et al. |
| 2017/0069214 | A1 * | 3/2017 | Dupray ................ G08G 5/0021 |
| 2017/0178072 | A1 | 6/2017 | Poomachandran et al. |
| 2017/0300855 | A1 * | 10/2017 | Lund ..................... B64C 39/024 |
| 2017/0316376 | A1 * | 11/2017 | Cooper ................ B64C 39/024 |
| 2017/0316699 | A1 * | 11/2017 | Gil ........................ B64C 39/024 |

OTHER PUBLICATIONS

Anonymous, "Finding Optimized Route for a User Based on Tips/Hints from Other Users," An IP.com Prior Art Database Technical Disclosure, IP.com No. IPCOM000245456D, Mar. 10, 2016 (3 pages).

Anonymous, "Secure Item Tracking for a Semi-Autonomous Vehicle Delivery System," An IP.com Prior Art Database Technical Disclosure, IP.com No. IPCOM000247073D, Aug. 2, 2016 (3 pages).

\* cited by examiner

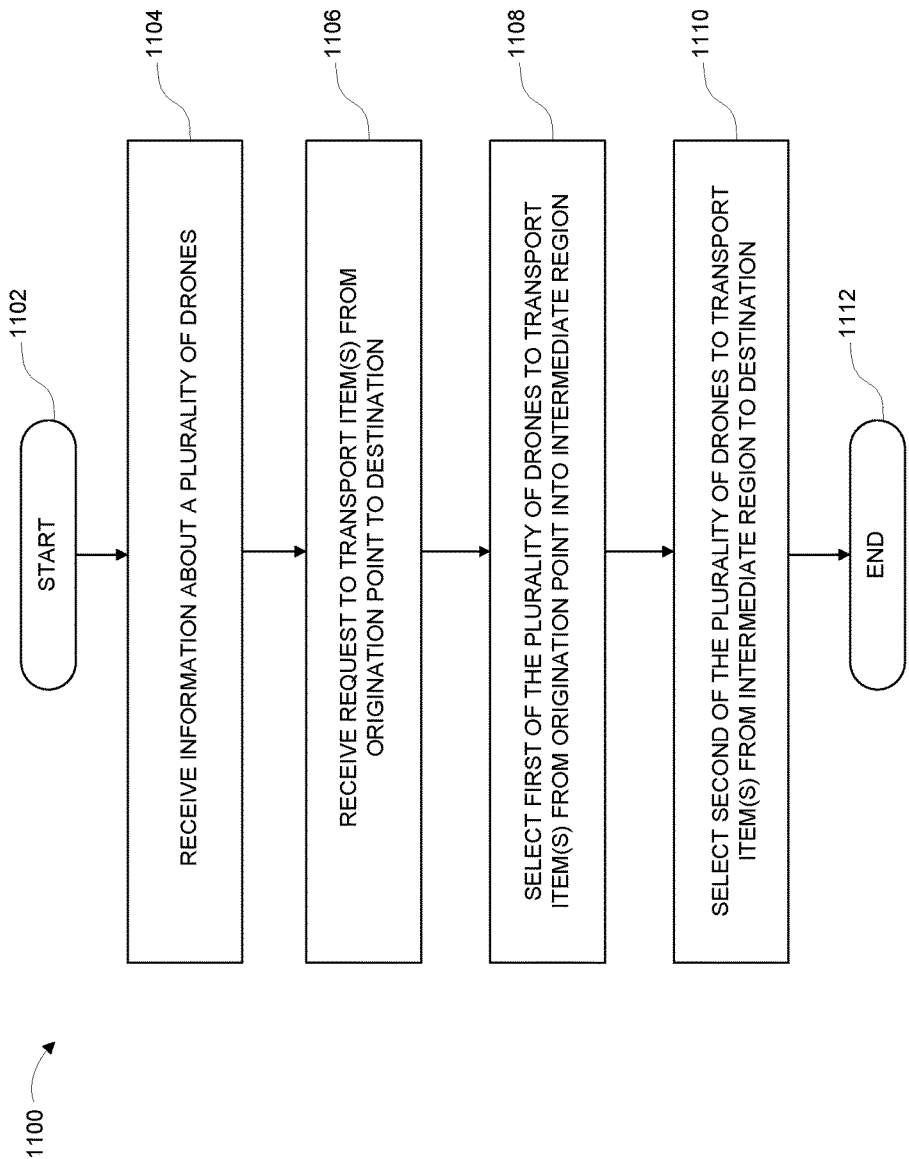

METHODS AND SYSTEMS FOR DRONE NETWORK DELIVERY SYSTEM

BACKGROUND OF THE INVENTION

Field of the Invention

The present invention relates in general to computing systems, and more particularly, to various embodiments for managing multiple drones, such as for transporting items.

Description of the Related Art

One of the problems expected with the practical implementation of drone (e.g., unmanned aerial vehicle (UAV)) based shipping and/or delivery systems is that the current state of the art drones have relatively limited ranges and/or carrying (or payload) capacity. As such, such drone based systems are often envisioned as being used in combination with conventional shipping/delivery systems, such as those utilizing larger (e.g., manned) aircraft and/or ground vehicles, particularly when the item(s) need to be transported long distances.

Ideally, drone based systems would be able to transport items long distances in such a way that little, if any, additional infrastructure (e.g., other vehicles), besides the drones themselves, is needed. Additionally, it would be desirable for the systems to transport the items from their origination points to their destinations with little human interaction in order to make the systems as efficient and cost-effective as possible.

SUMMARY OF THE INVENTION

Various embodiments for managing drones by one or more processors are described. In one embodiment, by way of example only, a method for managing drones, again by one or more processors, is provided. Information about each of a plurality of drones is received. Each of the plurality of drones is associated with a respective one of a plurality of users. A request to transport an item from an origination point to a destination is received. Based on the information about the plurality of drones, the origination point, and the destination, a first of the plurality of drones is selected to transport the item from the origination point to an intermediate region. Based on the information about the plurality of drones, the origination point, and the destination, a second of the plurality of drones is selected to transport the item from the intermediate region to the destination.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 11 is a flowchart diagram depicting an exemplary method for managing drones in which various aspects of the present invention may be implemented.

DETAILED DESCRIPTION OF THE DRAWINGS

Figure 1:
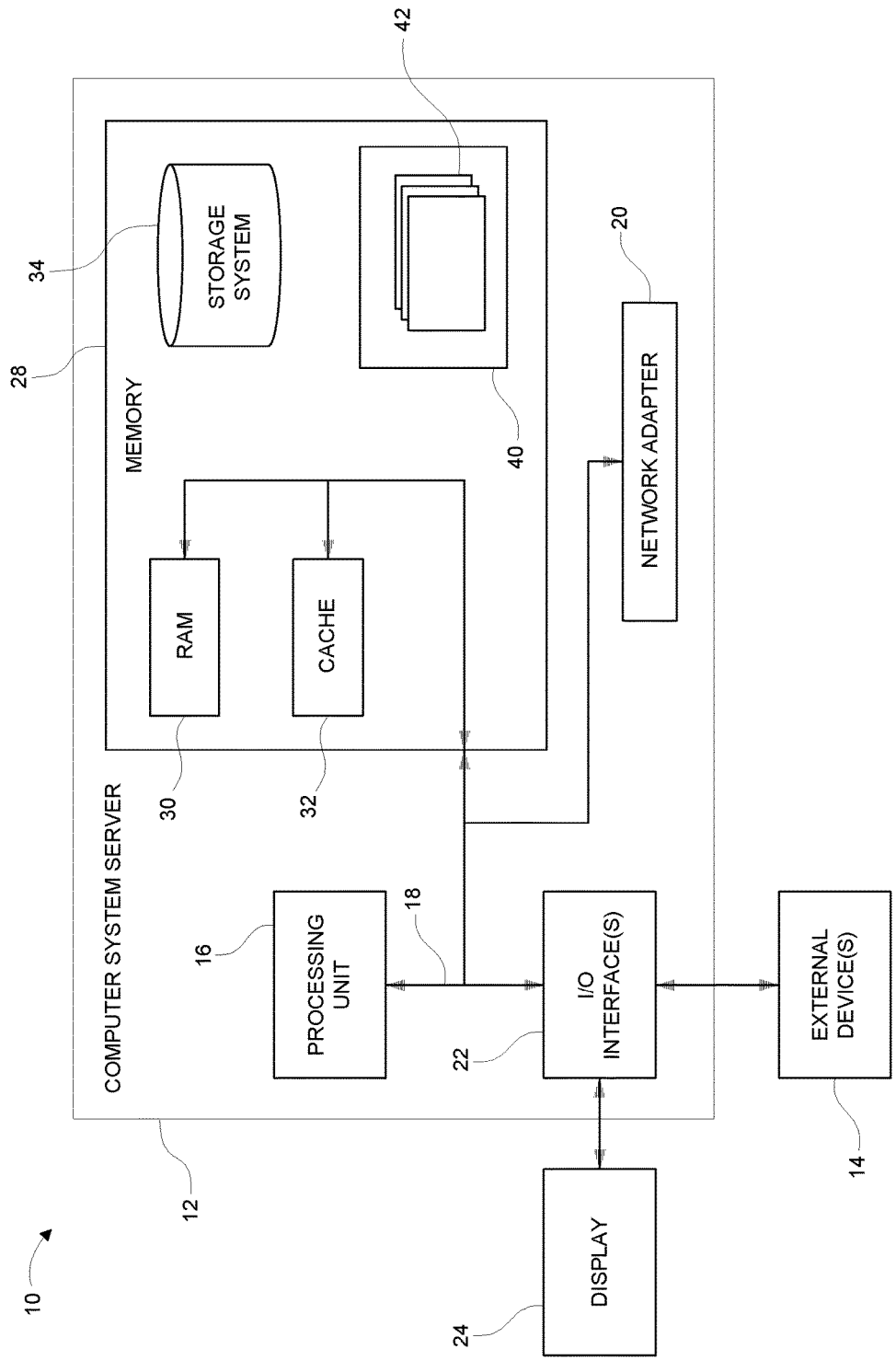
FIG. 1 is a block diagram depicting an exemplary computing node according to an embodiment of the present invention.

As previously indicated, because current drones (e.g., unmanned aerial vehicles (UAVs)) have relatively limited ranges and/or carrying (or payload) capacity, drone based shipping (and/or delivery) systems are often envisioned as utilizing, or being used in combination with, larger (e.g., manned) aircraft and/or ground vehicles (e.g., manned or driverless trucks). This is particularly the case when items are to be shipped long distances (e.g., from Los Angeles to New York City).

Consider an example in which a customer living in New York City orders an item from an online store based in Los Angeles. Given the current state of technology of drones, it is foreseeable that a drone based system (or multiple drone based systems) could transport the item from the online store's location in Los Angeles to, for example, Los Angeles International Airport and deliver the item from, for example, John F. Kennedy International Airport to the customer's residence. However, in all likelihood, the item would be transported from the Los Angeles area to the New York City area using primarily, if not entirely, other means, such as manned aircraft (and/or in some cases ground vehicles, such as delivery trucks, trains, etc.).

In view of the foregoing, a need exists for drone based shipping (or delivery) systems in which the need for other infrastructure (e.g., other vehicles) is reduced, if not completely eliminated.

To address these needs, the methods and systems of the present invention use, for example, multiple individual drones (e.g., UAVs) that are "based" (or housed or stored) across the area between, for example, an origination point and a destination for an item (or multiple items) that is to be shipped. For example, the drones may be private (or residential or civilian) drones owned by persons (or users) living at various locations in a particular region (e.g., a relatively large region, such as a state or a country). However, it should also be understood that the users may be businesses or other organizations. In some embodiments, users register with the system and provide information about his/her drone, such as the location where the drone is stored (e.g., his/her home address), the range of the drone, and the payload capacity of the drone (e.g., size and/or weight), to create a "network" or system of drones spread across a region (or multiple regions).

These details are stored in the system (e.g., a central server or database), and when a request is made (e.g., by one of the users or another person/entity) to ship (or transport) an item across the region, the system selects drones registered with the system to carry out the shipping process in, for example, a "relay" type manner (e.g., each of the drones is used to transport the item(s) a portion of the way between the origination point and the destination). In some embodiments, the drones are automatically controlled by the system (e.g., using the Global Positioning System (GPS)) to carry out the shipping process.

In some embodiments, the drones (and/or the users) are register in, or using, for example, a social media type website (e.g., one dedicated solely to shipping items and/or a general social media website that utilizes the functionality described herein). The same system used for registration may also be used to make requests to ship items. In some embodiments, requests may be made by entities (e.g., people or organizations) that do not have drones registered in the network or system in addition to users that do have drones registered.

In some embodiments, a method, by one or more processors, for managing drones is provided. Information is received about each of a plurality of drones. Each of the plurality of drones is associated with a respective one of a plurality of users. A request to transport an item from an origination point to a destination is received. Based on the information about the plurality of drones, the origination point, and the destination, a first of the plurality of drones is selected to transport the item from the origination point to an intermediate region. Based on the information about the plurality of drones, the origination point, and the destination, a second of the plurality of drones is selected to transport the item from the intermediate region to the destination.

The first of the plurality of drones may be controlled to transport the item from the origination point to the intermediate region, and the second of the plurality of drones may be controlled to transport the item from the intermediate region to the destination. The request to transport the item from the origination point to the destination may be received from one of the plurality of users. The information about each of the plurality of drones may include at least one of performance characteristics of the respective drone or a location where the respective drone is stored.

Based on the information about the plurality of drones, the origination point, and the destination, at least a third of the plurality of drones may also be selected to transport the item within the intermediate region. The first of the plurality of drones, the second of the plurality of drones, and the at least the third of the plurality of drones may be stored at locations remote from one another.

Each of the plurality of drones may be a UAV. However, it should be noted that the methods and systems described herein may (also) be used with ground based vehicles, such as unmanned ground vehicles (UGVs), and watercraft, such as unmanned surface vehicles (USVs).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors therein) is capable of being implemented and/or performing (or enabling or causing) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in a drone (e.g., a UAV). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
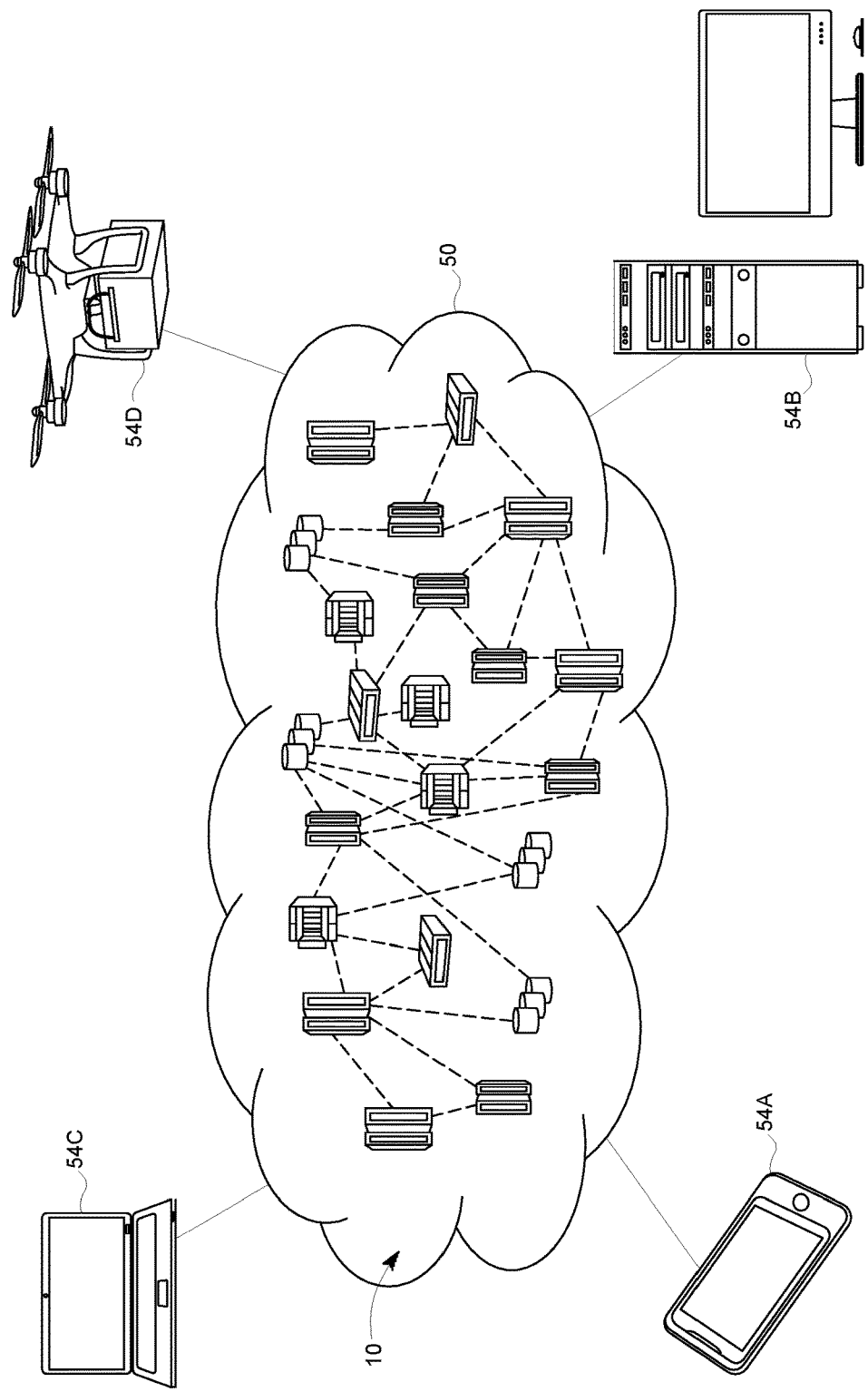
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and delivery computer systems, such as, for example, those in drone(s) 54D, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
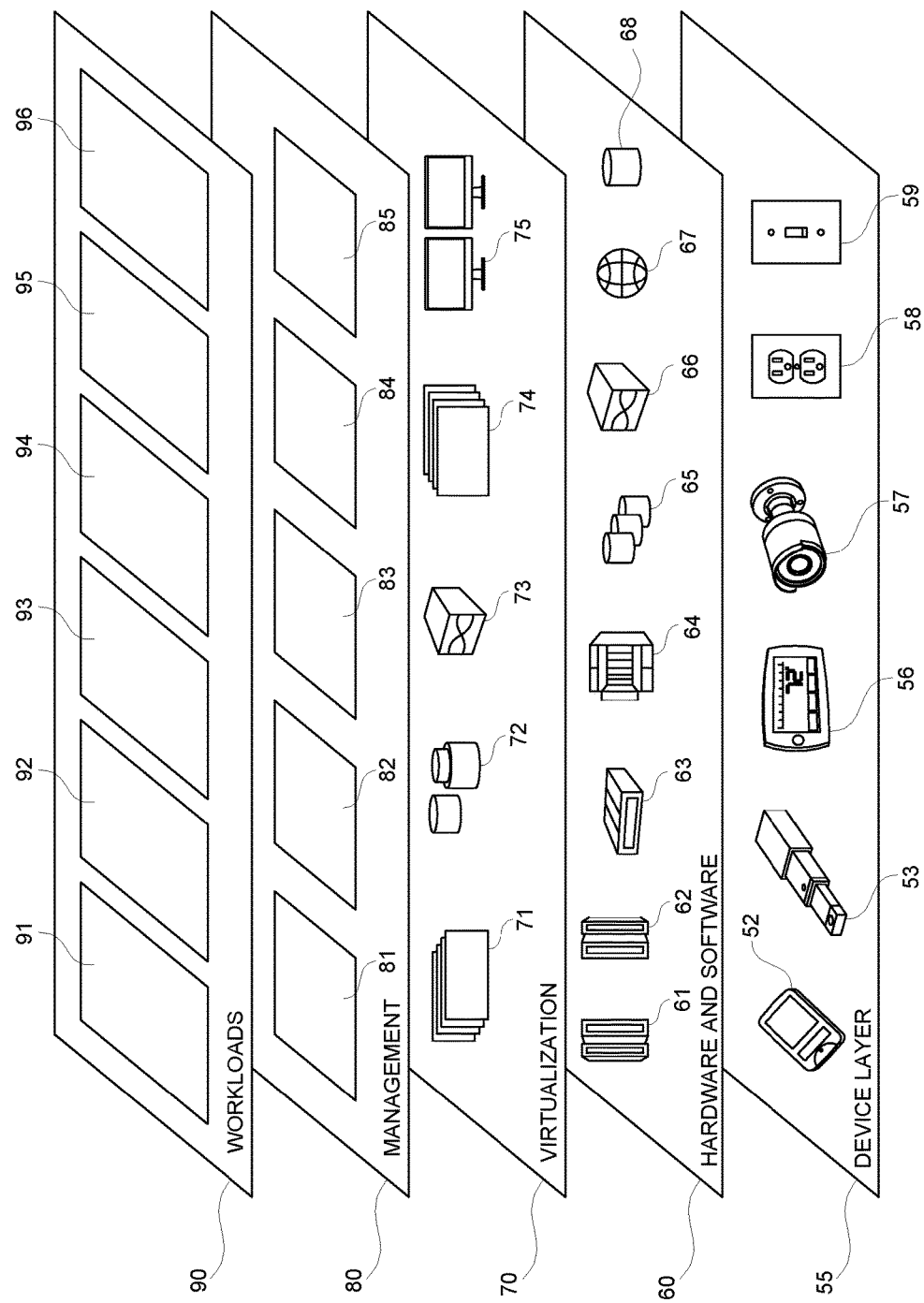
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to drones (e.g., UAVs and UGVs), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and controlling drones as described herein. One of ordinary skill in the art will appreciate that the workloads and functions 96 for managing and controlling drones may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing drones, such as managing drones to ship, deliver, and/or otherwise transport items. The methods and systems include a data collection aspect, where a variety of information about, for example, drones and/or the users (e.g., owners of) of the drones may be collected. In some embodiments, information about a plurality of drones and/or users associated with the drones is first collected (or received). The information may include the location where the drones are stored (e.g., the user's address) and performance characteristics of the drones, such as the range of the drones and the payload capacity of the drones (e.g., size and/or weight). The drones may be stored in various locations spread across any size region, such as a county, state, or country, and the users (or owners) of the drones may be private individuals (e.g., the drones may be residential/civilian/recreational drones) and/or organizations (e.g., the drones may be commercial drones owned by companies).

An exemplary drone (e.g., a UAV) 54D that may be utilized by the methods and systems described herein is shown in FIG. 2. Although not illustrated in detail, the drone 54D may include a fuselage, rotors, and a payload compartment. The fuselage may be located at a central portion of the drone and may include (e.g., in an interior compartment) a computing device (e.g., to control the flight of the drone, drop/release product(s), the coupling of the drone to other drones, etc.), a transceiver, and a power supply (e.g., a battery). In some embodiments, the drone 54D includes four rotors (e.g., the drone is in a quad-copter configuration), which are, for example, connected to the fuselage and spaced in pairs on opposing sides of the fuselage in a substantially rectangular configuration. However, it should be understood that the drone 54D shown in FIG. 2 is just an example of the type and shape of drone that may be used in the systems and methods described herein. Other suitable drones may have different propulsion systems and shapes (e.g., hexagonal, circular, etc.).

Each of the rotors may include a propeller and an actuator (e.g., an electric motor) configured to cause the propeller to rotate in a manner suitable to create sufficient lift to cause the drone 54D to fly. Further, in some embodiments, each of the rotors may be configured to rotate or tilt about one or more axis to enhance the flight and/or flight control of the drone 54D. Some of the rotors may be configured such that the respective propeller is rotated in a first direction (e.g., clockwise direction, as viewed from above the drone 54D), while some may be configured such that the propeller is rotated in a counterclockwise direction. Alternatively, the rotors may be configured to selectively rotate the propellers in both the clockwise and counterclockwise direction.

The payload compartment (or payload mechanism) may be positioned below, and may be connected to, the fuselage. The payload compartment may be (or include) any container suitable for storing one or more item during the transportation process and may include at least one actuator configured to release (or drop) the item(s) when the drone 54D is at an appropriate drop off (or delivery) point. For example, the payload compartment may include a door or shutter on a lower surface thereof, which when opened, causes the item(s) stored therein to drop from the payload compartment. Alternatively, the functionality provided by the payload compartment may be performed by a clamp or strap-like mechanism, which when opened, releases the product(s).

In some embodiments, the information is collected by the users (e.g., drone owners) registering with, for example, a social media style website (or any other suitable database). The information is stored and used to select drones from those that are registered to transport items as described below, after a request to transport an item is received (e.g., from one of the users or another person/entity). Additionally, the information collected/used may include, for example, the current date/season and weather data (e.g., temperature, chance of participation, etc.) associated with the region(s) through which the item(s) will be transported.

Requests to have items transported (or shipped) may be sent/received in any suitable manner, such as via the internet (e.g., using the same website used for user/drone registration) on a PDA, cellular telephone, desktop computer, etc. The requests may include any information pertinent to the transportation of the item, such as the origination (or pick-up) point (or location), the destination (or delivery point), the size and weight of the item(s), and/or a general description of the item(s). In some embodiments, the requests can be made by users (e.g., individuals or organizations) that have drones registered in the system and/or other persons/ entities (e.g., individuals or organizations) that do not have drones registered in the system.

In some embodiments, the requests are made in association with orders for goods from businesses (e.g., online shopping). However, it should be noted that in some embodiments, the transportation of the item(s) are not related to any business transaction taking place but rather the shipping of an item, such as a gift, from, for example, one person to another.

Figure 4:
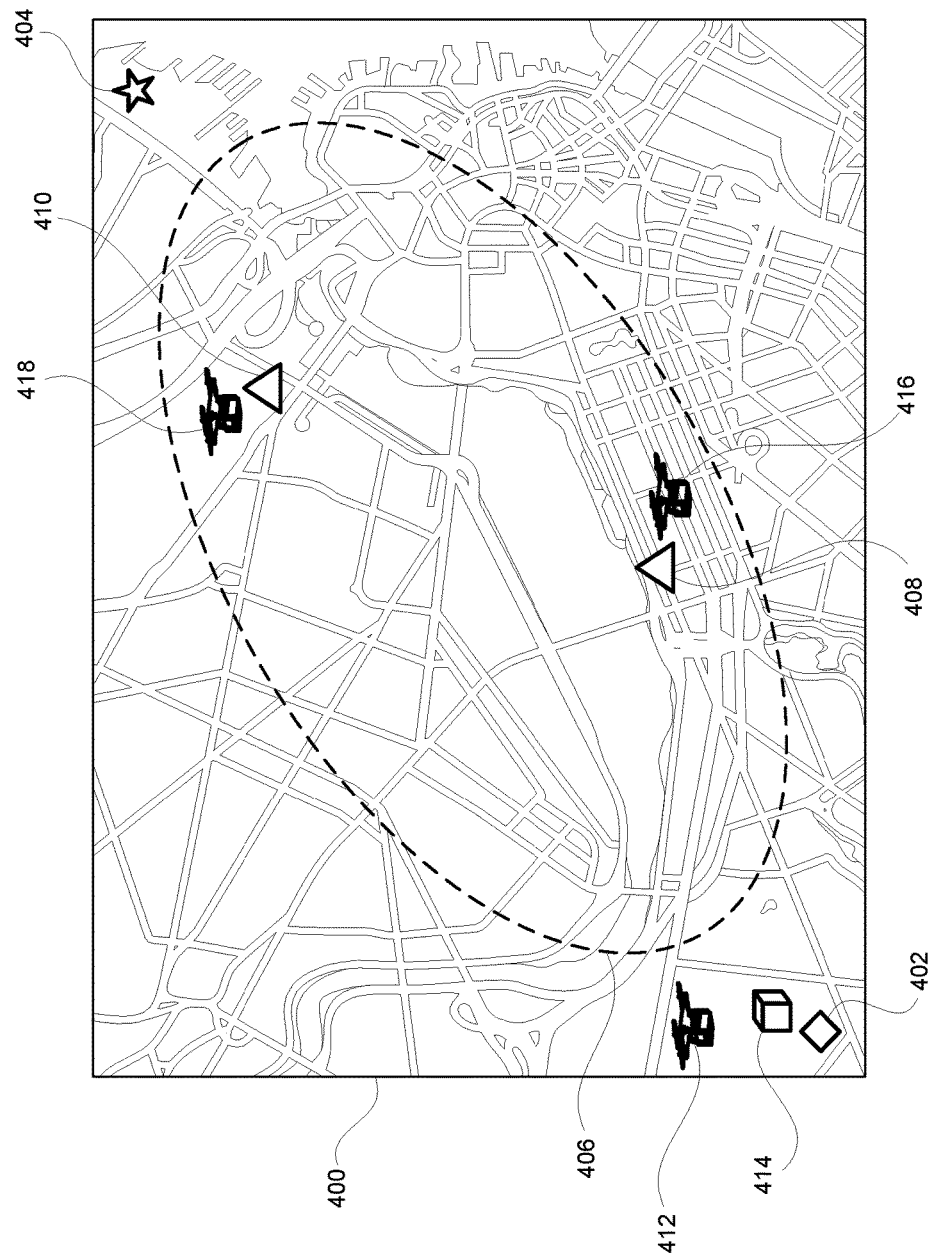
FIGS. 4-10 are plan views of a map of a region illustrating an item being transported across the region in accordance with aspects of the present invention.

Referring to FIG. 4, a map 400 of a particular geographic region is shown. On the map 400, exemplary locations of an origination point 402, a destination 404, and an intermediate region 406 that are associated with a request to transport an item (or multiple items) are shown. The origination point 402 is the location from which the item to be transported starts (e.g., from which it is shipped), and the destination (or delivery point) 404 is the location to which the item is to be transported (or delivered).

The intermediate region 406 may be considered to be an arbitrary region located, for example, (at least partially) between the origination point 402 and the destination 404. However, it should be understood that the size of the intermediate region 406 may correspond to the portion(s) of the distance between the origination point 402 and the destination 404 that a single drone may not be able to traverse because of the limited range of the drone. In other words, a single drone may be capable of transporting the transported item a distance that is approximately equal to the distance between the origination point 402 and the point of the intermediate region 406 nearest to the origination point 402 combined with the distance between the point of the intermediate region 406 nearest to the destination 404 and the destination 404.

After the request is received (and any payment arrangements are made if necessary), and the origination point and destination 404 have been determined, a delivery route (including drop off/pick up points) is determined and/or drones are selected to transport the item(s) based on the drones registered with the system and/or the availability of the drones registered with the system. The determination of the delivery route and/or the drones that are to be used may be performed in such a manner to optimize the transportation of the item(s) (e.g., to minimize the time it takes for the item(s) to reach the destination and/or to maximize efficiency with respect to power usage). In this way, suitable drones that registered with the system (e.g., such as those based within the intermediate region 406) may be selected to assist with the transportation of the item. The drones (e.g., the number and/or base locations of) may be selected based on any suitable information, such as the location of the origination point 402, the location of the destination 404, the size/weight of the item to be transported, the performance characteristics of the available registered drones (e.g., those within the intermediate region 406), and the locations at which the registered drones are based (or stored).

Still referring to FIG. 4, in the depicted embodiment, intermediate locations 408 and 410, along with a first drone 412, an item 414, a second drone 416, and a third drone 418 are also shown. The intermediate locations 408 and 410 refer to locations (e.g., user addresses) at which registered drones are based (or stored), which have been selected to assist with the transportation of the item 414. More particularly, the second drone 416 is based at intermediate location 408, and the third drone 418 is based at intermediate location 410.

In the example shown, the first drone 412 has also been selected. In some embodiments, the first drone 412 is based at the origination point 402 (i.e., the origination point 402 corresponds to the location of a registered user/drone), while in other embodiments, the first drone 412 is based at (or associated with) a different location (e.g., a registered user), which may not be shown on the map 400. In the particular embodiment shown in FIG. 4, none of the drones used are based at the destination 404. However, in some embodiments, a registered drone based at the destination 404 may be selected and utilized in the transportation of the item 414. After drones for transporting the item are selected, the item is transported from the origination point 402 to the destination 404 in, for example, the manner described below.

As indicated in FIG. 4, the item 414 starts at or near the origination point 402. For example, the item 414 may be placed in a particular area, such as a pick-up zone (e.g., in a driveway of a residence) where it is to be retrieved by a drone (e.g., the first drone 412). However, in embodiments in which the first drone 412 is associated with the origination point 402 (e.g., owned by a user at the origination point), the item 414 may be, for example, manually loaded onto the first drone 412 (e.g., by the user) to initiate the transportation of the item 414.

Figure 5:
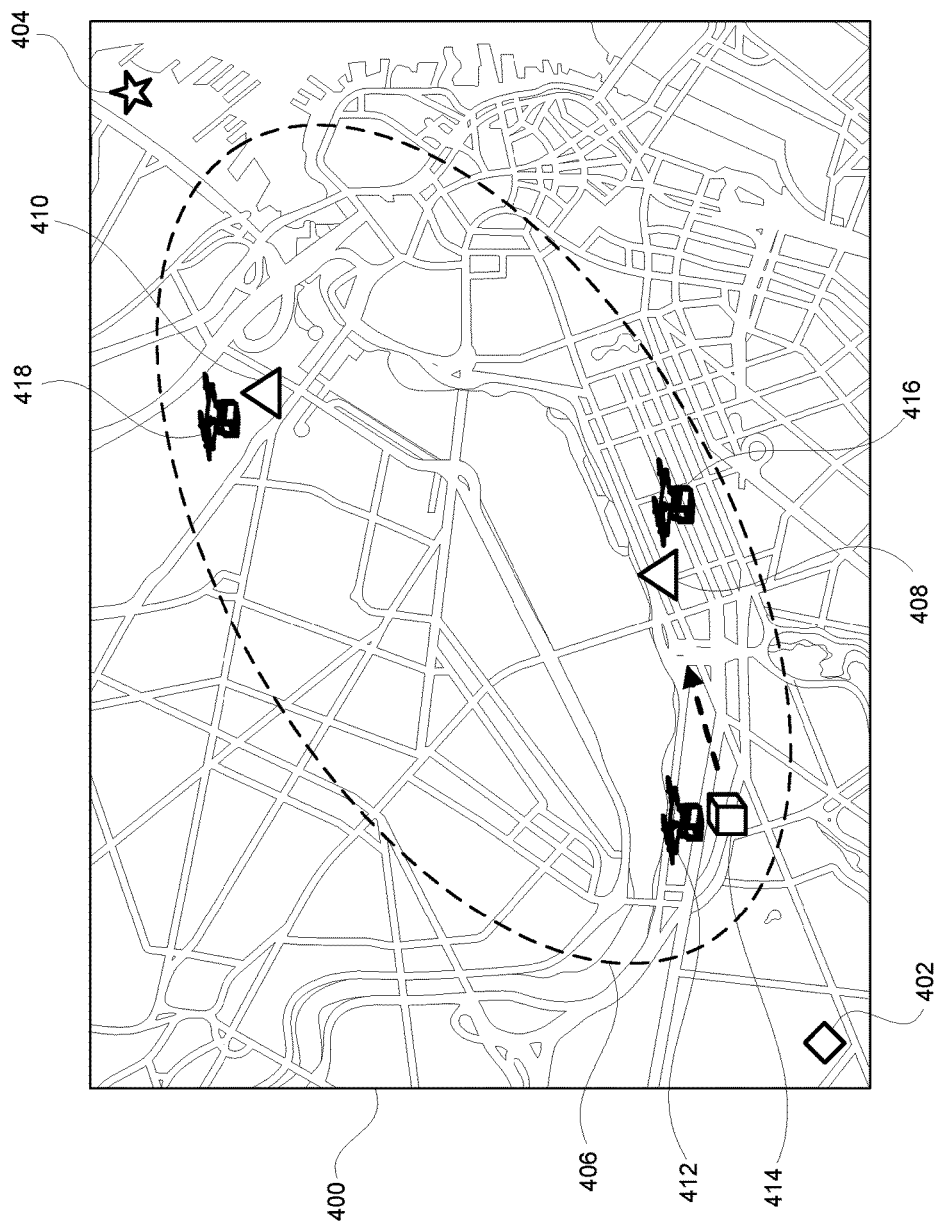

Referring now to FIG. 5, after the item 414 is retrieved by (or loaded onto) the first drone 412, the first drone 412 travels into the intermediate region 406 towards the intermediate location 408. It should be noted that the control of the drones may be performed automatically (e.g., via GPS) or manually (e.g., by the user/owner of the drone). In situations in which the drone(s) is controlled manually, the user/owner of the particular drone may receive a message (e.g., via text, email, etc.) that provides suitable instructions (e.g., item pick up time/location, drop off location for their portion of the transportation of the item, etc.).

Figure 6:
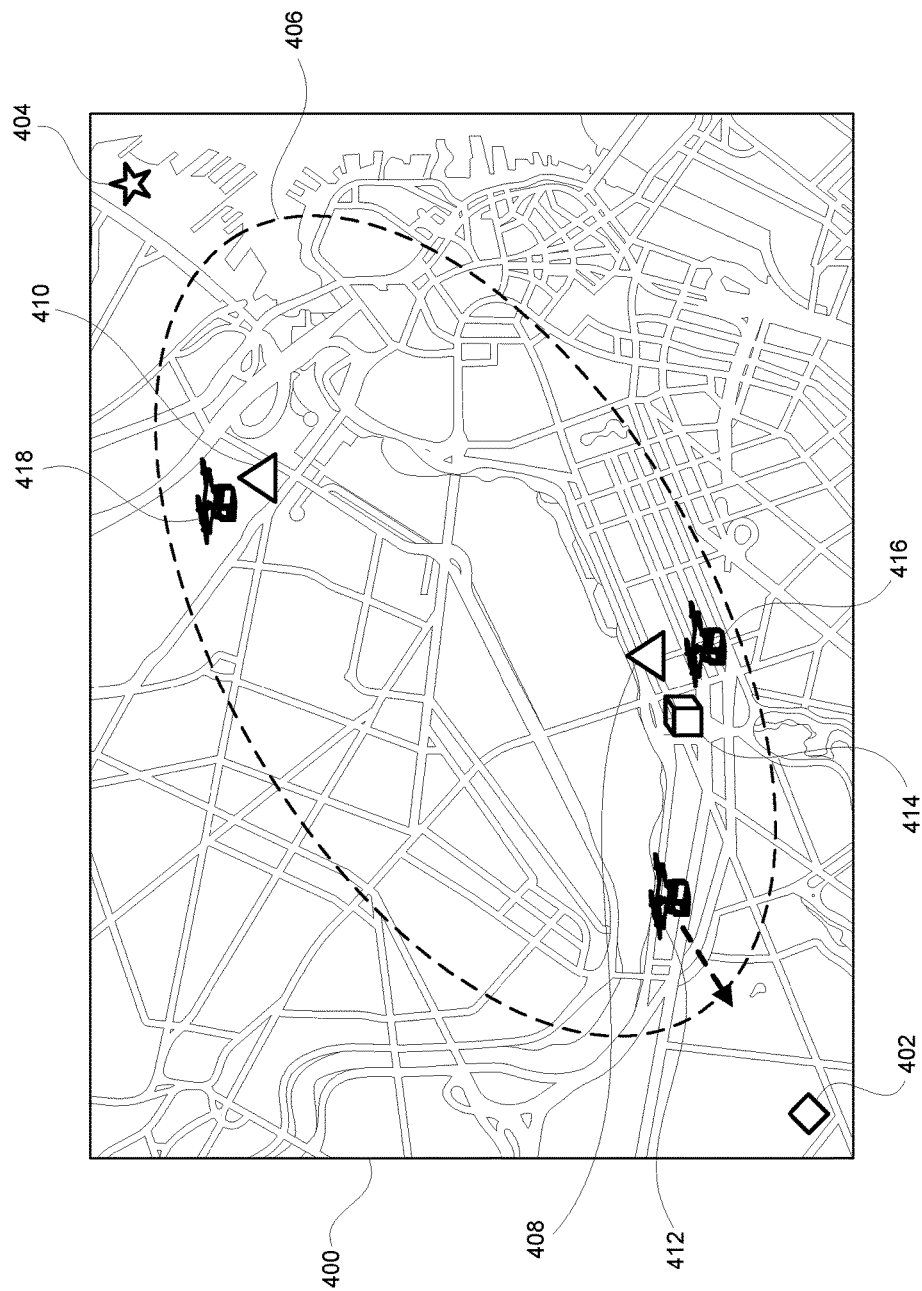

As shown in FIG. 6, the first drone 412 then leaves the item 414 at predetermined location (i.e., the location of the item 414 shown in FIG. 6), such as a drop zone near intermediate location 408. After the item 414 has been left at the appropriate location, the second drone 416 retrieves the item 414, and the first drone 412 may, for example, return to the location where it is based and/or be used to assist in the transportation of another item (e.g., if another request to transport an item is received).

In some embodiments, the drones are controlled so that the item 414 is stationary for as little time as possible. In the example shown in FIG. 6, the first drone 412 leaves the item 414 at a location that is in close proximity to the exact location where the second drone 416 is based/stored (e.g., intermediate location 408). Alternatively, in embodiments in which, for example, the item 414 is left at a location that is not in close proximity to where the second drone 416 is based, the second drone 416 may be controlled so that it arrives at the location of the item 414 immediately after (or perhaps before or at the same time) the item 414 is left by the first drone 412, as will be described below.

However, in some embodiments, a message (or indication) is sent from the drone(s) (and/or the users thereof) to, for example, a central server managing the drones after the drone(s) has completed its portion of the transportation process (e.g., after the drone has left the item(s) at the appropriate location). In such embodiments, after such a message has been received, the next drone (or a user thereof) may be instructed to begin its portion of the process (e.g., to retrieve the item).

Figure 7:
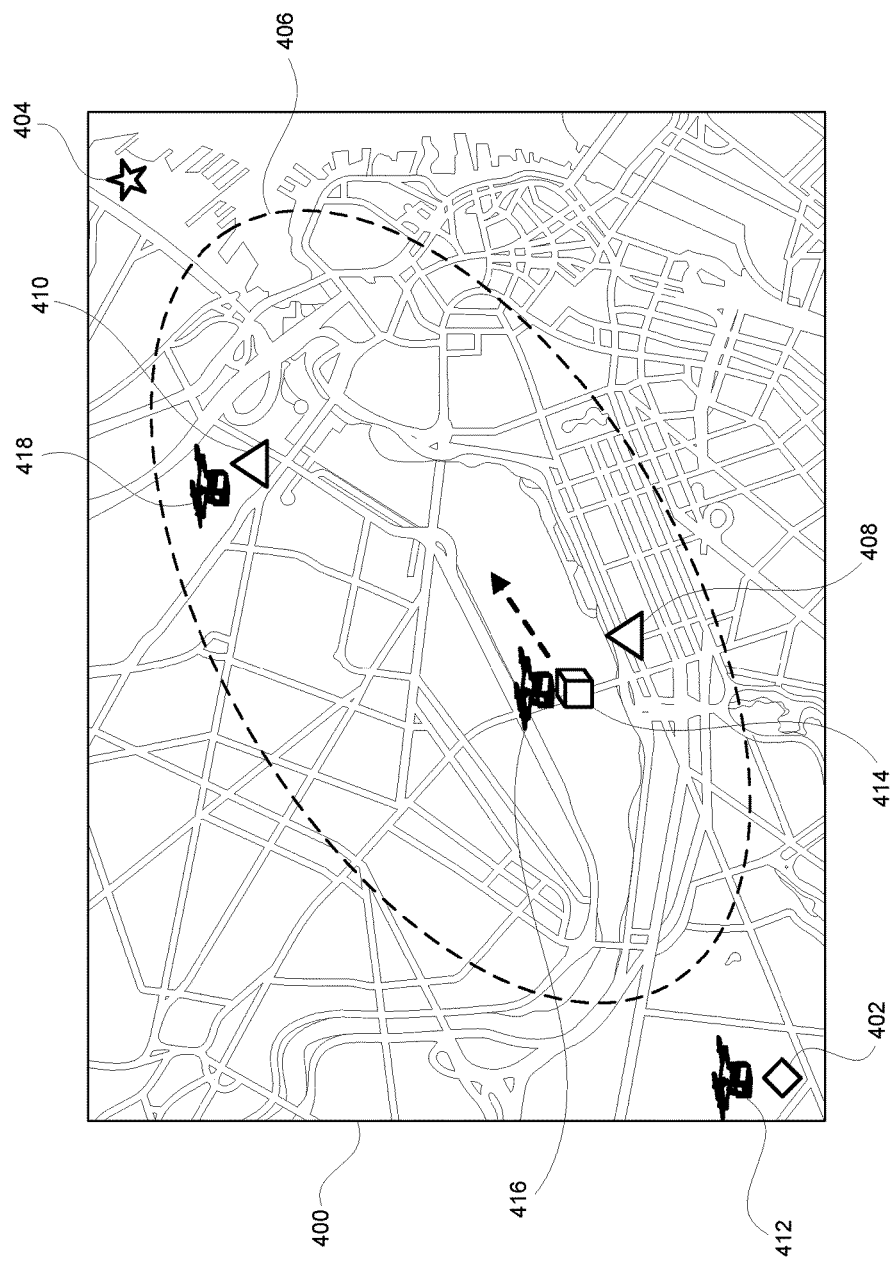

Referring now to FIG. 7, after the second drone 416 retrieves the item 414, the second drone travels (e.g., automatically or via manual control) in, for example, the general direction of the destination 404 and/or intermediate location 410). In the particular example shown in FIG. 7, the second drone 416 is traveling in a direction that is more directly towards the destination 404, as opposed to intermediate location 410.

Figure 8:
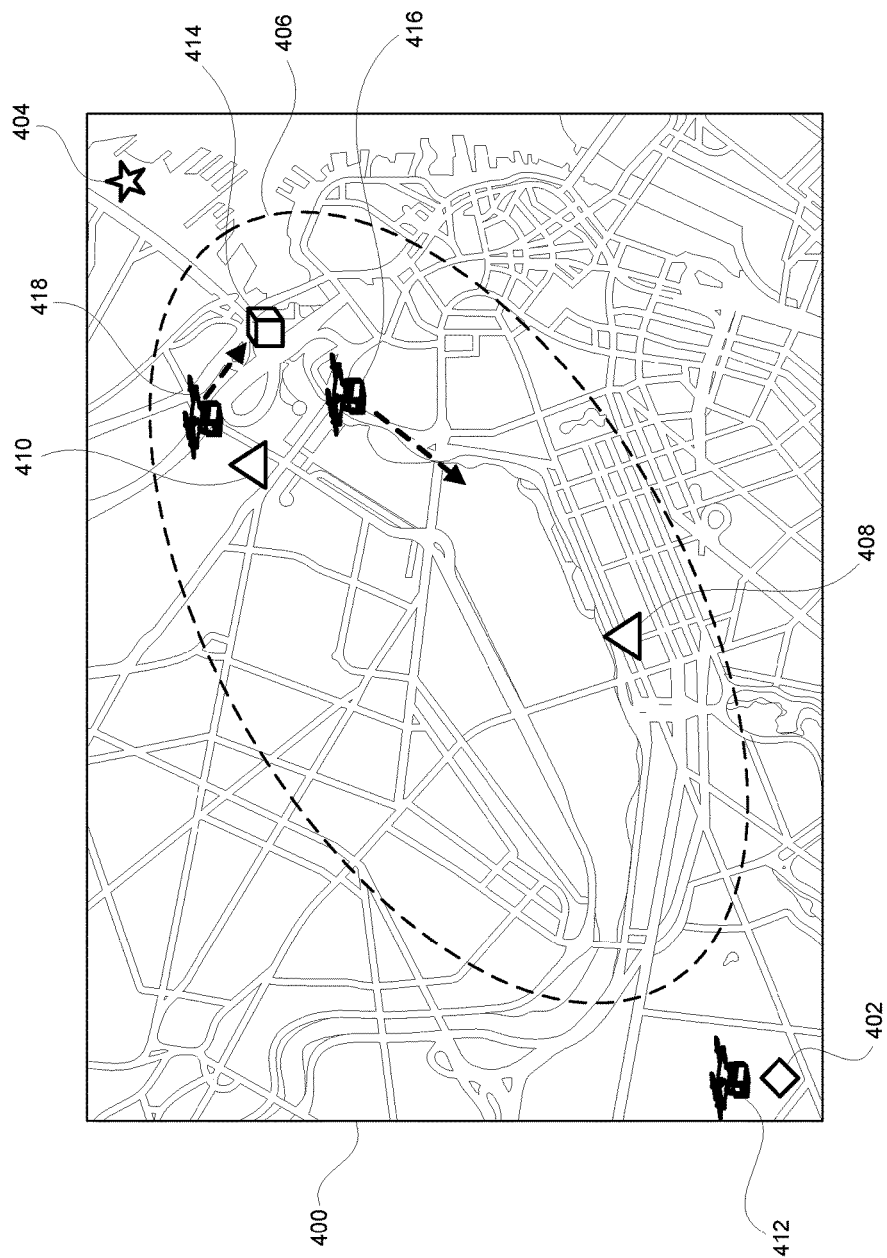

As shown in FIG. 8, the second drone 416 then leaves the item 414 at a predetermined location (e.g., the location of the item 414 shown in FIG. 8). It should be noted that in this example, the item 414 has been left by the second drone 416 at a location that is not necessarily as close as possible to intermediate location 410. As such, the third drone 418 travels from intermediate location 410 in the direction shown in FIG. 8 to retrieve the item 414. After the second drone 416 has left the item 414 at the appropriate location, the second drone 416 may then, for example, return to intermediate location 408 and/or be used to assist in the transportation of another item in a manner similar to that described herein.

Figure 9:
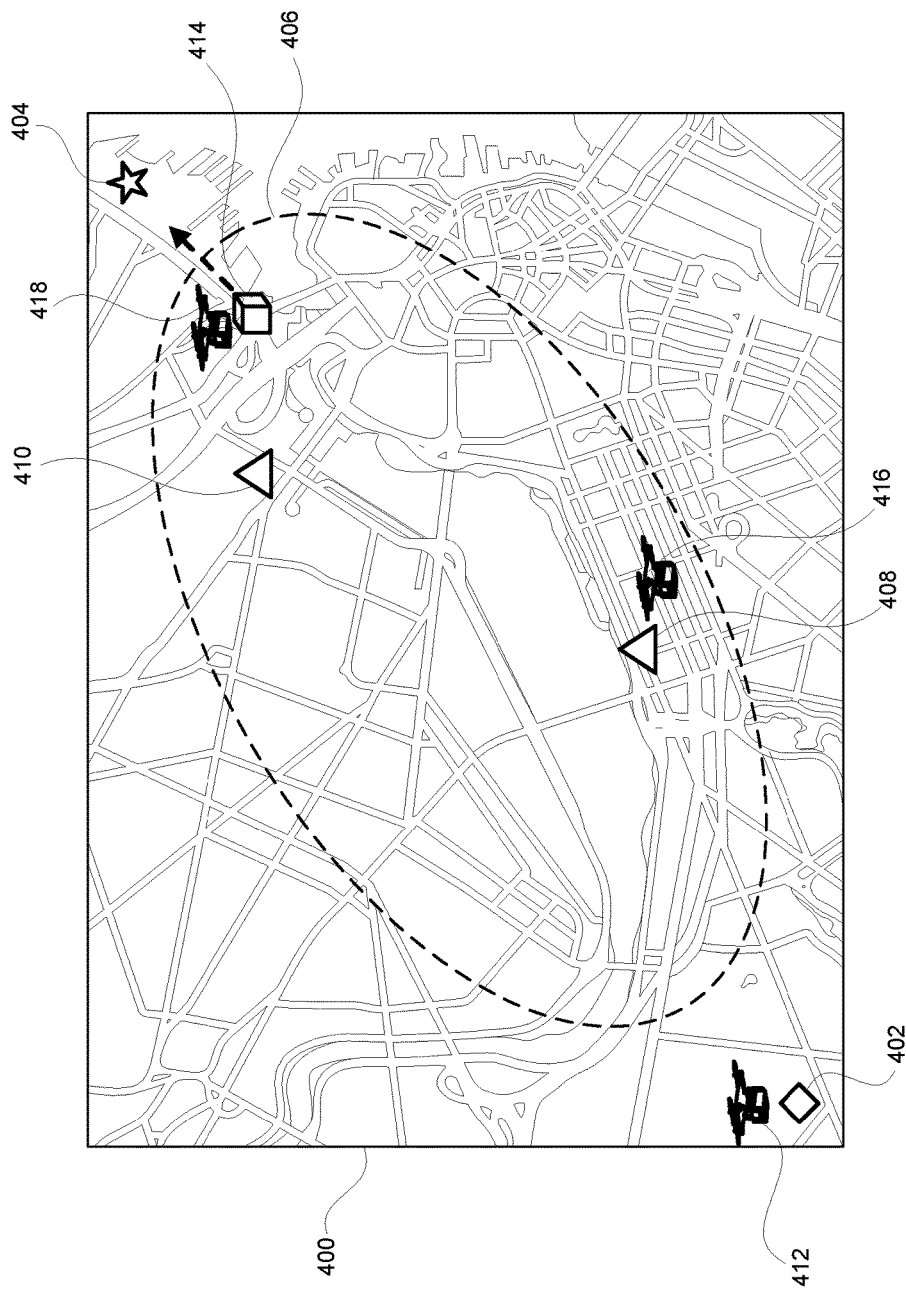

Referring to FIG. 9, the third drone 418 then retrieves the item 414 and travels towards the destination 404. Again, the drones used to transport the item 414 may be controlled/managed in such manner so that the item 414 remains stationary for as little time as possible and/or the overall efficiency of the system is optimized. For example, in the embodiment shown in FIG. 9, the third drone 418 may begin traveling towards the location where the second drone 416 leaves the item 414 while the second drone 416 is en route and/or arrive at that location at about the same time as the second drone 416.

Figure 10:
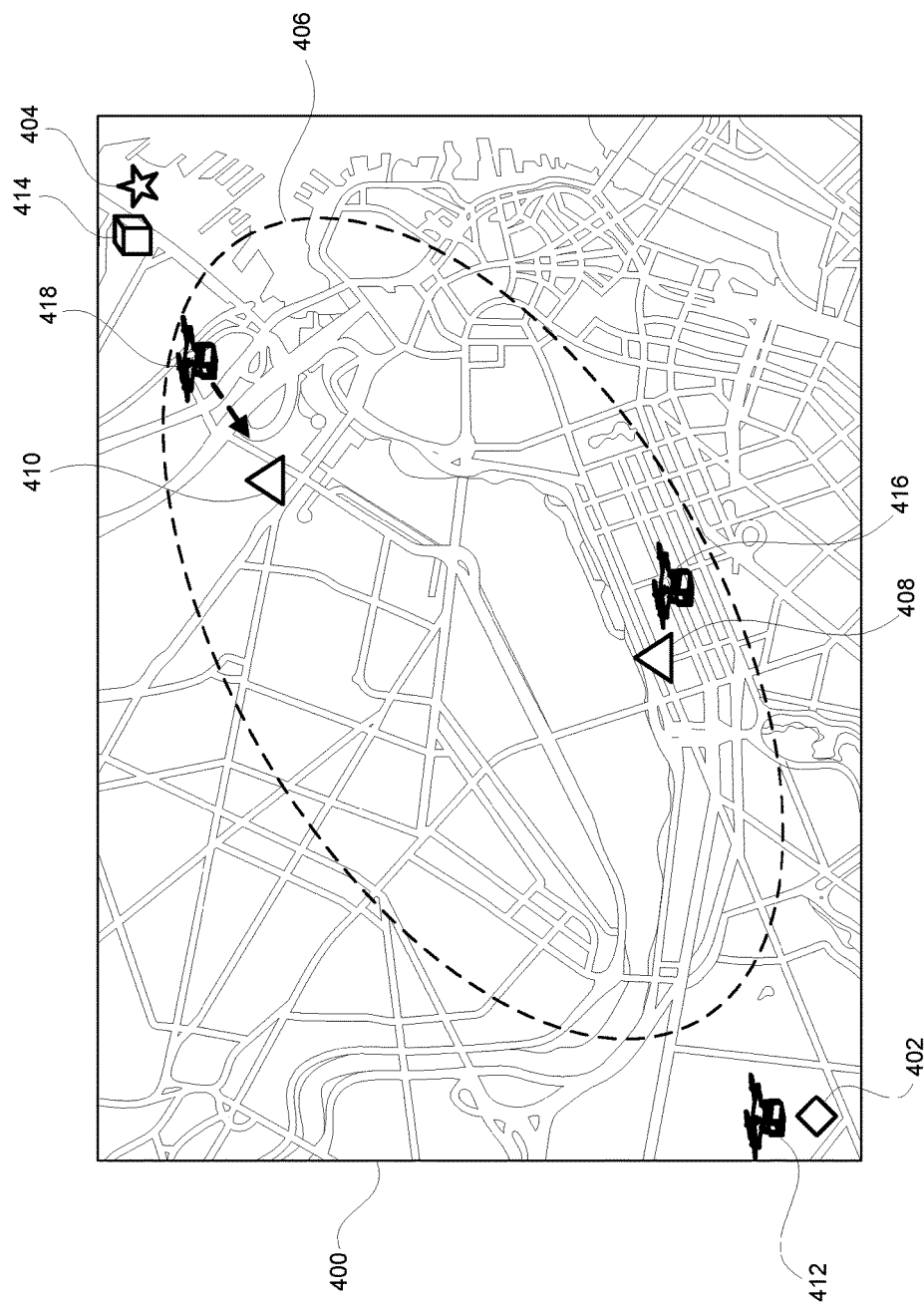

In the depicted embodiment, the third drone 418 transports the item 414 out of the intermediate region 406 and leaves the item at a predetermined drop off (or delivery) point, such as one near the destination 404 (e.g., a driveway or back porch of a residence), as shown in FIGS. 9 and 10, thus completing the requested transportation of the item 414. The third drone 418 may then, for example, return to intermediate location 410 and/or be used to assist in the transportation of another item in a manner similar to that described herein.

It should be understood that the example described above and shown in FIGS. 4-10 may be significantly simplified compared to real world implementations. That is, in other embodiments, a vastly greater number (e.g., dozens, hundreds, etc.) of drones may be selected and used in the transportation process, as it should be appreciated that the region(s) across which the item(s) is transported (e.g., the distance between the origination point and the destination) may extend, for example, hundreds, even thousands, of miles.

Turning to FIG. 11, a flowchart diagram of an exemplary method 1100 for managing drones (e.g., to transport items), in accordance with various aspects of the present invention, is illustrated. Method 1100 begins (step 1102) with, for example, a system being initiated in which multiple drones may be registered to take part in the drone based transportation methods and systems described herein. For example, the system may be a social media type website or any other suitable database.

Information is received about each of a plurality of drones (step 1104). Each of the plurality of drones may be associated with (e.g., owned by) a respective one of a plurality of users (e.g., individuals or organizations). In some embodiments, the information is received by the users registering their drone(s) with the systems described herein (e.g., a social media type website or any other suitable database). The information may include, for example, the location where the drones are stored (e.g., the user's address) and performance characteristics of the drones, such as the range of the drones and the payload capacity of the drones (e.g., size and/or weight). The drones may be stored in various locations spread across any size region, such as a county, state, or country, and the users (or owners) of the drones may be private individuals (e.g., the drones may be residential/civilian/recreational drones) and/or organizations (e.g., the drones may be commercial drones, owned by a company).

A request to transport one or more items is then received (step 1106). The request to have the item(s) transported (or shipped) may be sent/received in any suitable manner, such as via the internet (e.g., using the same website/database used for user/drone registration) on a PDA, cellular telephone, desktop computer, etc. The requests may include any information pertinent to the transportation of the item, such as the origination (or pick-up) point (or location), the destination (or delivery point), the size and weight of the item(s), and/or a general description of the item(s). In some embodiments, the requests can be made by users (e.g., individuals or organizations) that have drones registered in the system and/or other persons/entities (e.g., individuals or organizations) that do not have drones registered in the system. In some embodiments, the requests are associated with orders for goods from businesses (e.g., online shopping). However, it should be noted that in some embodiments, the transportation of the item(s) are not related to any business transaction taking place but rather the shipping of an item, such as a gift, from, for example, one person to another.

A first of the plurality of drones (e.g., the drones registered with the system) is then selected (step 1108). More particularly, in some embodiments, a first drone is selected to transport the item(s) from the origination point into an intermediate region. A second of the plurality of drones (e.g., the drones registered with the system) is then selected (step 1110). More particularly, in some embodiments, a second drone is selected to transport the item(s) from the intermediate region to the destination.

As described above, the intermediate region may refer to a region that is at least partially positioned between the origination point and the destination associated with the transportation of the item(s). The selection of the drones (e.g., UAVs) used to transport the item(s) (and/or a delivery route that will be used to transport the item(s)) may be performed in such a manner to optimize the transportation of the item(s) (e.g., to minimize the time it takes for the item(s) to reach the destination and/or to maximize efficiency with respect to power usage). In this way, suitable drones that registered with the system (e.g., such as those based within the intermediate region) may be selected to assist with the transportation of the item. The drones may be selected based on any suitable information, such as the location of the origination point, the location of the destination, the size/weight of the item to be transported, and the performance characteristics of the available registered drones, and the locations at which the drones are based (or stored). In at least some embodiments, each of the drones used (or at least some of them) is owned or associated with unique users and/or owners (e.g., each of the drones is private owned by a respective user) and is based (or stored) at a location that is remote from the other drones used (e.g., each of the drones is based/stored at a location that is spaced a substantial distance, such as several miles, from the other drones that are selected).

Method 1100 ends (step 1112) with, for example, the item(s) being transported from the origination point to the destination using at least the first and second selected drones. More particularly, as described above, the first drone may transport the item(s) from the origination point into the intermediate region, and the second drone may transport the item(s) from the intermediate region to the destination. That is, the drones may be used to transport the item(s) in a relay type manner from the origination point to the destination, as described above. In some embodiments, the drones are controlled automatically using, for example, the GPS. However, in some embodiments, the drones may be controlled manually (e.g., by the owners of the drones).

It should be understood that in other embodiments more than two drones may be used. For example, additional drones (e.g., a third, fourth, fifth, etc.) may be selected to, for example, transport the item(s) across the intermediate region if so needed. In this manner, the network of drones may be used to transport item(s) across large regions (e.g., across a state or country).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing drones, comprising:
receiving information about each of a plurality of drones, wherein each of the plurality of drones is associated with a respective one of a plurality of users, and wherein receiving the information comprises receiving, by a drone delivery network from each of the plurality of users, registration information associated with respective ones of the plurality of drones, the registration information including at least a storage location address, a range, and a payload capacity of the respective ones of the plurality of drones;
receiving a request to transport an item from an origination point to a destination;
based on the information about the plurality of drones, the origination point, and the destination, selecting a first of the plurality of drones to transport the item from the origination point into an intermediate region; and
based on the information about the plurality of drones, the origination point, and the destination, selecting a second of the plurality of drones to transport the item from the intermediate region to the destination.

2. The method of claim 1, further including:
controlling the first of the plurality of drones to transport the item from the origination point into the intermediate region; and
controlling the second of the plurality of drones to transport the item from the intermediate region to the destination.

3. The method of claim 1, wherein the request to transport the item from the origination point to the destination is received from one of the plurality of users.

4. The method of claim 1, wherein the information about each of the plurality of drones includes at least one of performance characteristics of the respective drone or a location where the respective drone is stored.

5. The method of claim 1, further including, based on the information about the plurality of drones, the origination point, and the destination, selecting at least a third of the plurality of drones to transport the item within the intermediate region.

6. The method of claim 5, wherein the first of the plurality of drones, the second of the plurality of drones, and the at least the third of the plurality of drones are stored at locations remote from one another.

7. The method of claim 1, wherein each of the plurality of drones is an unmanned aerial vehicle (UAV).

8. A system for managing drones, comprising:
at least one processor that
receives information about each of a plurality of drones, wherein each of the plurality of drones is associated with a respective one of a plurality of users, and wherein receiving the information comprises receiving, by a drone delivery network from each of the plurality of users, registration information associated with respective ones of the plurality of drones, the registration information including at least a storage location address, a range, and a payload capacity of the respective ones of the plurality of drones;
receives a request to transport an item from an origination point to a destination;
based on the information about the plurality of drones, the origination point, and the destination, selects a first of the plurality of drones to transport the item from the origination point into an intermediate region; and
based on the information about the plurality of drones, the origination point, and the destination, selects a second of the plurality of drones to transport the item from the intermediate region to the destination.

9. The system of claim 8, wherein the at least one processor further:
controls the first of the plurality of drones to transport the item from the origination point into the intermediate region; and
controls the second of the plurality of drones to transport the item from the intermediate region to the destination.

10. The system of claim 8, wherein the request to transport the item from the origination point to the destination is received from one of the plurality of users.

11. The system of claim 8, wherein the information about each of the plurality of drones includes at least one of performance characteristics of the respective drone or a location where the respective drone is stored.

12. The system of claim 8, wherein the at least one processor further, based on the information about the plurality of drones, the origination point, and the destination, selects at least a third of the plurality of drones to transport the item within the intermediate region.

13. The system of claim 12, wherein the first of the plurality of drones, the second of the plurality of drones, and the at least the third of the plurality of drones are stored at locations remote from one another.

14. The system of claim 8, wherein each of the plurality of drones is an unmanned aerial vehicle (UAV).

15. A computer program product for managing drones by one or more processors, the computer program product comprising a non-transitory computer-readable storage medium having computer-readable program code portions stored therein, the computer-readable program code portions comprising:
a first executable portion that receives information about each of a plurality of drones, wherein each of the plurality of drones is associated with a respective one of a plurality of users, and wherein receiving the information comprises receiving, by a drone delivery network from each of the plurality of users, registration information associated with respective ones of the plurality of drones, the registration information including at least a storage location address, a range, and a payload capacity of the respective ones of the plurality of drones;
a second executable portion that receives a request to transport an item from an origination point to a destination;
a third executable portion that, based on the information about the plurality of drones, the origination point, and the destination, selects a first of the plurality of drones to transport the item from the origination point into an intermediate region; and
a fourth executable portion that, based on the information about the plurality of drones, the origination point, and the destination, selects a second of the plurality of drones to transport the item from the intermediate region to the destination.

16. The computer program product of claim 15, wherein the computer-readable program code portions further include:
a fifth executable portion that controls the first of the plurality of drones to transport the item from the origination point into the intermediate region; and
a sixth executable portion that controls the second of the plurality of drones to transport the item from the intermediate region to the destination.

17. The computer program product of claim 15, wherein the request to transport the item from the origination point to the destination is received from one of the plurality of users.

18. The computer program product of claim 15, wherein the information about each of the plurality of drones includes at least one of performance characteristics of the respective drone or a location where the respective drone is stored.

19. The computer program product of claim 15, wherein the computer-readable program code portions further include a fifth executable portion that, based on the information about the plurality of drones, the origination point, and the destination, selects at least a third of the plurality of drones to transport the item within the intermediate region.

20. The computer program product of claim 19, wherein the first of the plurality of drones, the second of the plurality of drones, and the at least the third of the plurality of drones are stored at locations remote from one another.

21. The computer program product of claim 15, wherein each of the plurality of drones is an unmanned aerial vehicle (UAV).

* * * * *